United States Patent [19]

Wang et al.

[11] Patent Number: 5,664,156
[45] Date of Patent: Sep. 2, 1997

[54] MICROCONTROLLER WITH A RECONFIGURABLE PROGRAM STATUS WORD

[75] Inventors: Johannes Wang, Redwood City; Ata R. Khan, Saratoga, both of Calif.

[73] Assignee: Philips Electronics North America Corporation, New York, N.Y.

[21] Appl. No.: 308,058

[22] Filed: Sep. 16, 1994

[51] Int. Cl.[6] .................................................. G06F 3/00
[52] U.S. Cl. ............................. 395/500; 364/DIG. 2; 364/933.62; 711/156
[58] Field of Search ............................. 395/500, 725, 395/481, 483; 365/189.12; 364/200, 300, 900, DIG. 2

[56] References Cited

U.S. PATENT DOCUMENTS

| | | | |
|---|---|---|---|
| 4,167,779 | 9/1979 | Sullivan et al. | 364/200 |
| 4,204,252 | 5/1980 | Hitz et al. | 364/200 |
| 4,259,718 | 3/1981 | Kaman et al. | 364/200 |
| 4,315,321 | 2/1982 | Parks, III et al. | 364/900 |
| 4,812,975 | 3/1989 | Adachi et al. | 364/300 |
| 5,062,034 | 10/1991 | Bakker | 364/200 |
| 5,245,575 | 9/1993 | Sasaki et al. | 365/189.12 |
| 5,278,973 | 1/1994 | O'Brien et al. | 395/500 |
| 5,317,750 | 5/1994 | Wickersheim et al. | 395/725 |
| 5,446,865 | 8/1995 | Corcoran et al. | 395/500 |

*Primary Examiner*—Kevin J. Teska
*Assistant Examiner*—Russell W. Frejd
*Attorney, Agent, or Firm*—Debra K. Stephens

[57] ABSTRACT

A microcontroller routs bits of a PSW to and from a bus depending on a mode. Whenever in a mode compatible with a prior generation microcontroller, address and routing circuitry using decoders and multiplexers, during a read operation, places bits of the PSW of the current generation on the bus at a location of the prior generation microcontroller. In a write operator circuitry also moves bits from the bus in an arrangement compatible with the prior generation and stores them in the arrangement of the current generation. The circuitry also allows various units such as the ALU to update the PSW register bits directly without making a bus transfer.

7 Claims, 4 Drawing Sheets

PSW REGISTER

MICROCONTROLLER WITH A RECONFIGURABLE PROGRAM STATUS WORD

BACKGROUND OF THE INVENTION

1. Field of the Invention

The present invention is directed to a microcontroller with a program status word that can be reconfigured to be compatible with a prior generation microcontroller and, as a result, allows multiple microcontroller modes to coexist and, more particularly, to a system with selection and routing circuitry for selecting and rearranging bits of the program status word responsive to the multiple modes of the microcontroller.

2. Description of the Related Art

Microcontrollers are being called upon to perform more and more complex tasks in less and less time. This has required microcontrollers to be redesigned to be more complex and faster. More complex microcontrollers have many more functions and operations that need to be monitored. As a result, the program status word (PSW) of the redesigned microcontrollers has gotten larger with a larger number of status bits. For example, when a microcontroller grows from an eight bit architecture to a sixteen bit architecture the PSW can grow to twelve or sixteen bits. Because of the architectural and layout considerations of the redesign process, as well as PSW size considerations, it is sometimes necessary to rearrange and relocate the status bits of a PSW as compared to the bit arrangement found in a previous generation of microcontroller. However, users of the prior generation of microcontrollers are reluctant to discard or rewrite software designed for the prior generation and prefer that succeeding generations of microcontrollers be capable of running the older software. This requires that the PSW of the newer generation of microcontrollers be compatible with prior generations.

As a result, what is needed is a microcontroller in which the PSW is compatible between generations even when the size and bit arrangement of the PSW has changed.

SUMMARY OF THE INVENTION

It is an object of the present invention to provide a microcontroller with a program status word (PSW) that is compatible with a prior generation microcontroller.

It is another object of the present invention to provide a system that routs bits of the PSW to the proper location depending on the mode of the microcontroller.

It is also an object of the present invention to convert a larger PSW to the smaller PSW of a prior generation of microcontroller.

It is an additional object of the present invention to allow old or prior generation instructions and new instructions, or old and new modes of generation, to coexist on the same microcontroller.

The above objects can be attained by a microcontroller which includes address and bit routing circuitry that routs bits of a PSW to and from a bus depending on the mode of the microcontroller. Whenever the microcontroller is in a mode where the microcontroller is compatible with a prior generation microcontroller instruction or at any time desired, the address and routing circuitry can place bits of the PSW of the current generation on the bus at a location suitable for processing by the prior generation microcontroller. This allows old and new modes of operation to coexist. The circuitry also reads bits from the bus in an arrangement compatible with the prior generation and stores them in the arrangement of the current generation.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
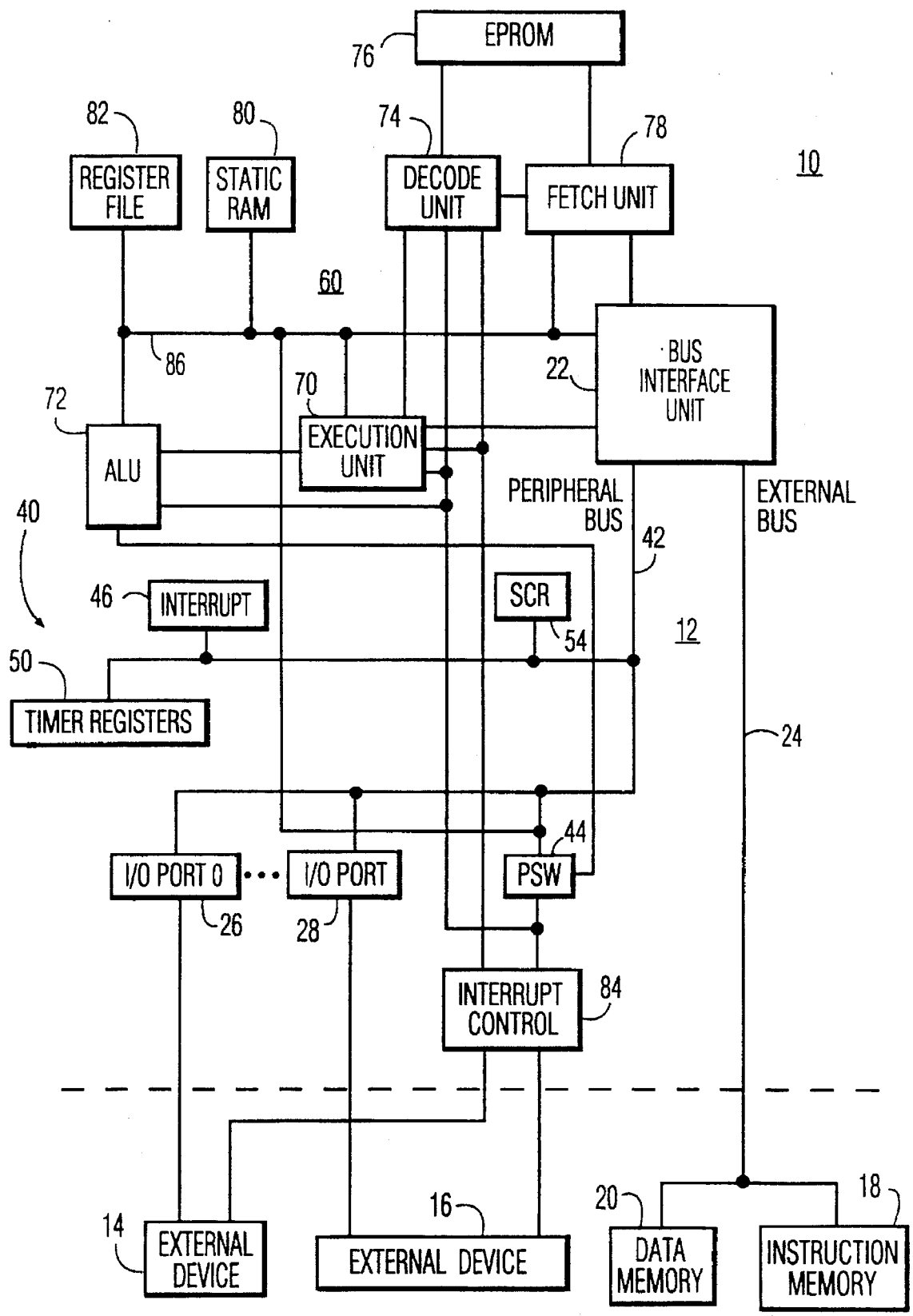
FIG. 1 depicts the architecture of the microcontroller of the present invention.

The architecture of the microcontroller system 10 of the present invention is illustrated in FIG. 1. This system 10 includes a single chip microcontroller 12 that performs 16 bit arithmetic operations and includes internal instruction and data storage. The microcontroller 12 supports external devices 14 and 16 and, through 24 bit external address capability, supports sixteen megabytes of external instruction storage 18 and sixteen megabytes of external data storage 20. The microcontroller 12 includes a bus interface unit 22 which communicates with the external memories 18 and 20 over an external bi-directional address and data bus 24. The microcontroller 12 communicates with the external devices 14 and 16 through I/O ports 26–28 which are addressable as special function registers (SFR) 40. The ports 26–28 as well as other special function registers are addressable over an internal peripheral bus 42 through the bus interface unit 22. The data memory 20 can also be accessed as off-chip memory mapped I/O through the I/O ports 26–28 which access is illustrated by the dashed line. The on-chip special function registers 40, some of which are bit addressable, also include a program status word (PSW) register 44 coupled to an interruption control unit 84 communicating with the external devices as well as an ALU 72, an execution unit 70 and a decode unit 74 for flag and general control. An interrupt register 46, timer registers 50 and a system configuration register (SCR) 54 containing system configuration bits are also provided as special function registers 40. The PSW register 44 is addressable over the peripheral bus 42 for general register operations and is also addressable over a connection to the internal bus 86 for other execution related operations. The PSW register 44 is also coupled to the ALU 72 and the parity, overflow defect, zero defect and operator defect circuits associated with the ALU 72 and the execution unit 70. The bus interface unit 22 isolates the peripheral special function registers 40 from the microcontroller core 60. The core 60 includes the execution unit 70 which is microcode programmable and controls execution of instructions by the ALU 72 and the other units. The instructions decoded by a decode unit 74 are fetched from an internal EPROM 76, which is part of the instruction memory space, or from the external instruction memory 18 by a fetch unit 78. Static RAM 80, which is part of the data memory space, as well as general purpose registers of a register file 82 are also available for instruction and data storage.

Figure 2:
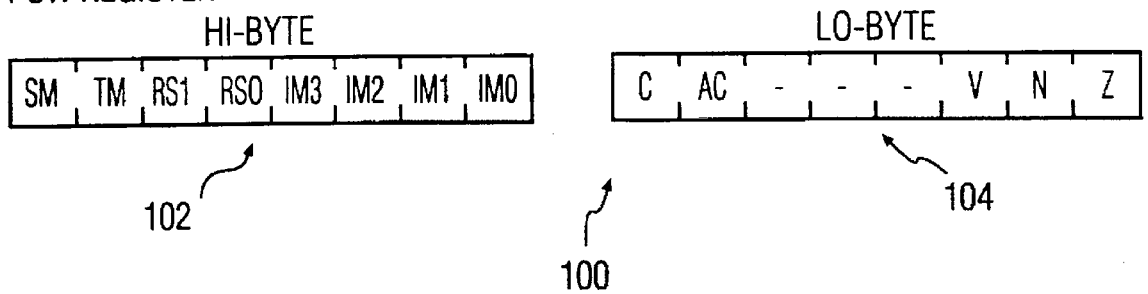
FIG. 2 illustrates the program status word (PSW) of the microcontroller.

The program status word register 44 includes a program status word 100 as illustrated in FIG. 2 which is accessible by a new generation of instructions. The PSW register 44 is a word register in the bit-addressable SFR space 40. The high byte (PSWH) 102 is a protected half containing the system/supervisor level flags. The second or lower byte (PSWL) 104 contains all user level flags and functions as described below. Most arithmetic logic, and data transfer instructions update some or all of the status flags. Update of the PSW status flags is suppressed during any write to the PSW. The data written to the PSW takes precedence over normal flag updates. This applies to both bytes of the PSW during a byte write to one half of the PSW. C is the carry flag and the main function of this flag is to store the carry out of the most significant bit of an arithmetic operation by the ALU 72. AC is auxiliary carry flag which is updated during arithmetic instructions with the carry out of the least significant nibble of the ALU 72. F0 and F1 are user definable flags and may be read and written by user programs. RS1 and RS0 are register bank select bits which identify one of four groups or banks of registers R0 through R7 in the register file 82 which are active at a given time. The four register banks are also addressable directly and indirectly as the bottom 32 bytes of data memory. V is the overflow flag and is set by a twos complement arithmetic overflow condition during arithmetic instructions executed by the ALU 72. P is parity flag and this bit shows the even parity for the current contents of register R4L: (the low byte of register 4) (this register is used for compatibility with the A register of the 80C51 microcontroller by Philips Semiconductor which is an example of a prior generation microcontroller). SM is the system mode bit flag. The system mode is selected at reset, can be changed during interrupt processing and is written by return from interrupt (RETI) by popping the PSW. This is intended as an aid to multitasking applications. TM is the trace-mode bit and is used to aid in the program development to allow instruction-by-instruction tracing. Z is a first operation indication or zero defect flag and after a data operation the Z flag is set to 1 if the operation returned a result of 0, otherwise the Z flag is cleared to 0. N is a negative indication flag and after a data operation the N flag is set to 1 if the operation returned a result with the sign bit (MSB) set, otherwise the N flag is cleared to 0. IM3-IM0 are execution priority interrupt mask bits where these bits are used to identify the execution priority of the currently executing code. In the case of an interrupt, these bits will be set to the interrupt priority of the interrupt in progress. These bits can be also changed or written during interrupt processing. The microcontroller 12 supports saving and restoring of these bits during traps, interrupts, and return from interrupt, as well as providing lines from these bits through the interrupt control unit 84 to any interrupt control module outside of the core. Writes to the IM bits are restricted to system mode code. An additional flag exists in the microcontroller 12 that is not reflected in the PSW or directly visible to a running program. This is the accumulator zero flag (AZ). This is used to implement the 80C51 microcontroller Jump-Zero (JZ) and Jump-Not-Zero (JNZ) instructions. 80C51 code directly tests the A register contents to execute these instructions. The microcontroller 12 updates the embedded AZ flag during any operation that alters R4L, which is the register used to mimic the 80C51 microcontroller accumulator.

The system configuration register (SCR) 54 is a byte register that contains system configuration flags. This register 54 includes flags that are intended to be programmed once after reset and left alone thereafter. These flags therefore do not need to be saved during interrupts or other procedures. One of these flags the CM flag is important to this invention. CM is the compatibility mode flag. This is the mode in which the PSW of the 80C51 is used. Of course the PSW of the 80C51 can also be accessed at other times when CM=0.

Figure 3:
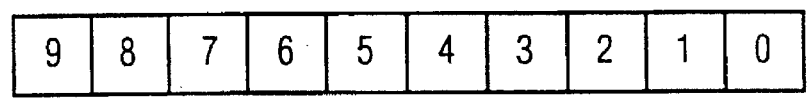
FIG. 3 depicts the bit address encoding of the special function registers of the present invention.

The microcontroller 12 supports bit addressing of the PSW using instructions. The encoding of the 10-bit field 130 within an instruction for bit addressing is shown in FIG. 3. Bits 9 and 8 determine whether the register addressed is in the SFR space 40 (bit 9) or the register file 82 (bit 8). Bits 7-3 identify the byte of the register being addressed and bits 2-0 identify the particular bit within the byte.

Figure 4:
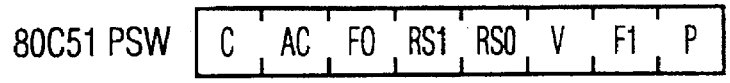
FIG. 4 illustrates the arrangement of the PSW bits as used by a prior generation microcontroller.

As discussed with respect to FIG. 2 the PSW 100 of the microcontroller 12 has a certain arrangement produced by the design process. The 80C51 microcontroller, on the other hand, uses a PSW 200 as illustrated in FIG. 4. This version of the PSW is accessible by the instructions of the 80C51 allowing different modes or generations of instructions to exist within the same program. In this version of the PSW the status bits C,AC,F0,RS1,RS0,V,F1 and P are made available for reads or writes to or from the register 44 depending on the particular address of the PSW provided. The upper and lower halves of the PSW 100 are also made available depending on the address. The lower half or byte PSWL 104 of PSW 100 is provided on the peripheral bus 42 when an address such as 400 is used during a peripheral bus special function register (SFR) read in the SFR space 40, PSWH 102 is provided when an address such as 401 is used and PSW 200 is provided when an address such as 402 is used. During a write only the particular bit of the particular format PSW is transferred to the register 44 from the bus 42.

Figure 5:
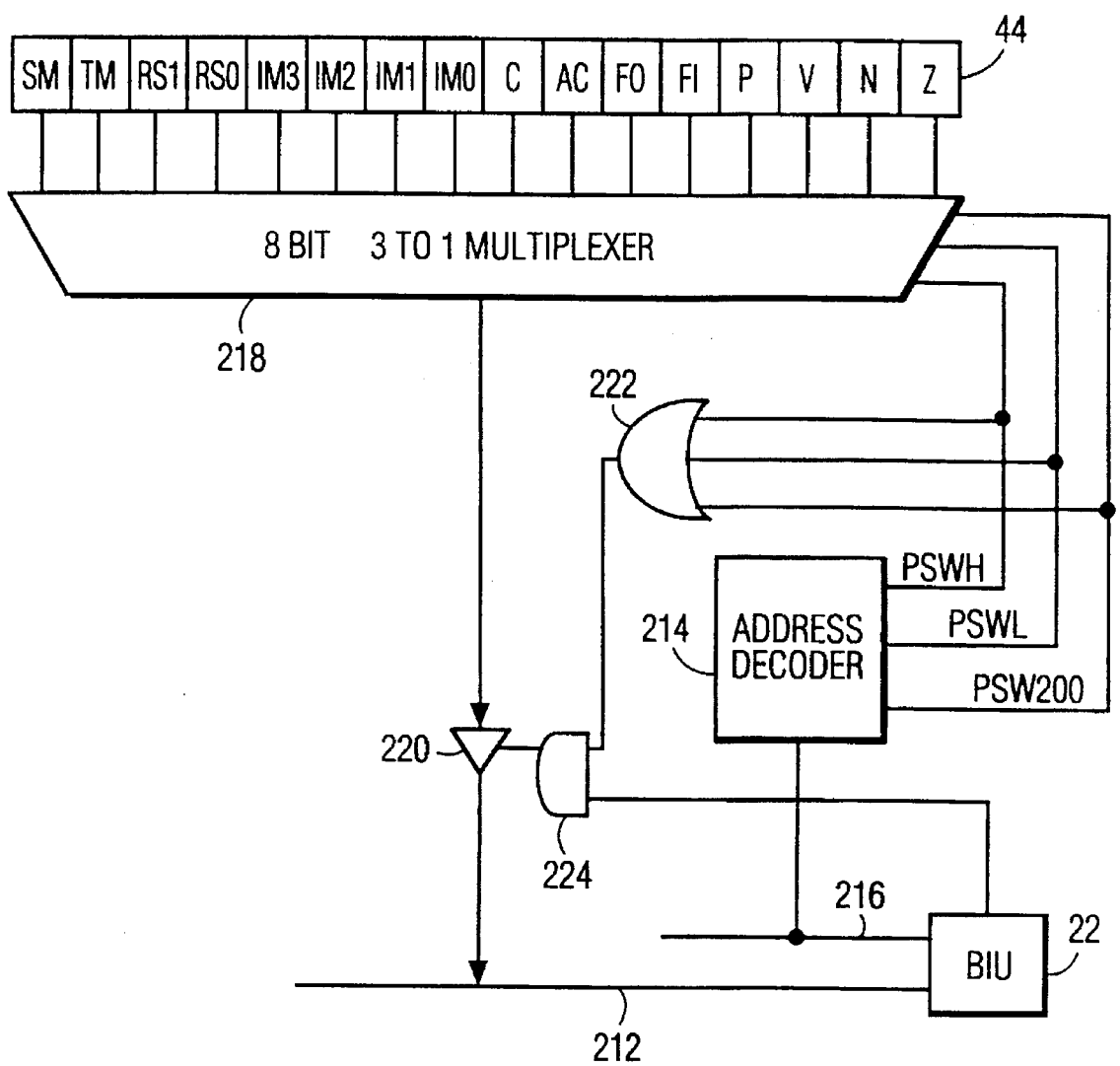
FIG. 5 depicts a PSW read circuit according to the present invention.

To provide the different bytes of the PSW 100 and the PSW 200 from the same physical register 44, an address decoding and bit selection circuit 210, as illustrated in FIG. 5, determines which PSW and/or byte is being addressed and selects the appropriate eight bits to apply to the peripheral data bus 212. During a read operation an address decoder 214 receives an address from the fetch unit 78 through the bus interface unit (BIU) 22 over the peripheral address bus 216 and determines which byte of PSW 100 or whether PSW 200 is being addressed. The decoder 214 produces one of three selection signals that are applied to a multiplexer 218. The multiplexer 218 is an eight bit, three to one multiplexer that selects from three groups of eight bits depending on the selection signal provided. When PSWH is asserted the multiplexer 218 selects SM,TM,RS1,RS0 and IM3-IM0, when PSWL is asserted the multiplexer outputs C,AC,"0", "0","0",V,N and Z, the binary "0" being produced for three bits because F0,F1 and P bits are not used by the microcontroller 12, and when PSW200 is asserted the multiplexer 218 selects and outputs C,AC,F0,RS1,RS0,V,F1 and P. The multiplexer 218 provides the selected eight bits to an eight bit tristate driver 220 connected to the peripheral data bus 212. The driver 220 is activated when one of the selection signals passes through an OR gate 222 and is coincident with a peripheral bus read signal applied to an AND gate 224 by the BIU 22. The BIU 22 transfers the bits of the selected PSW or byte on the bus 212 to the destination core unit.

Figure 6:
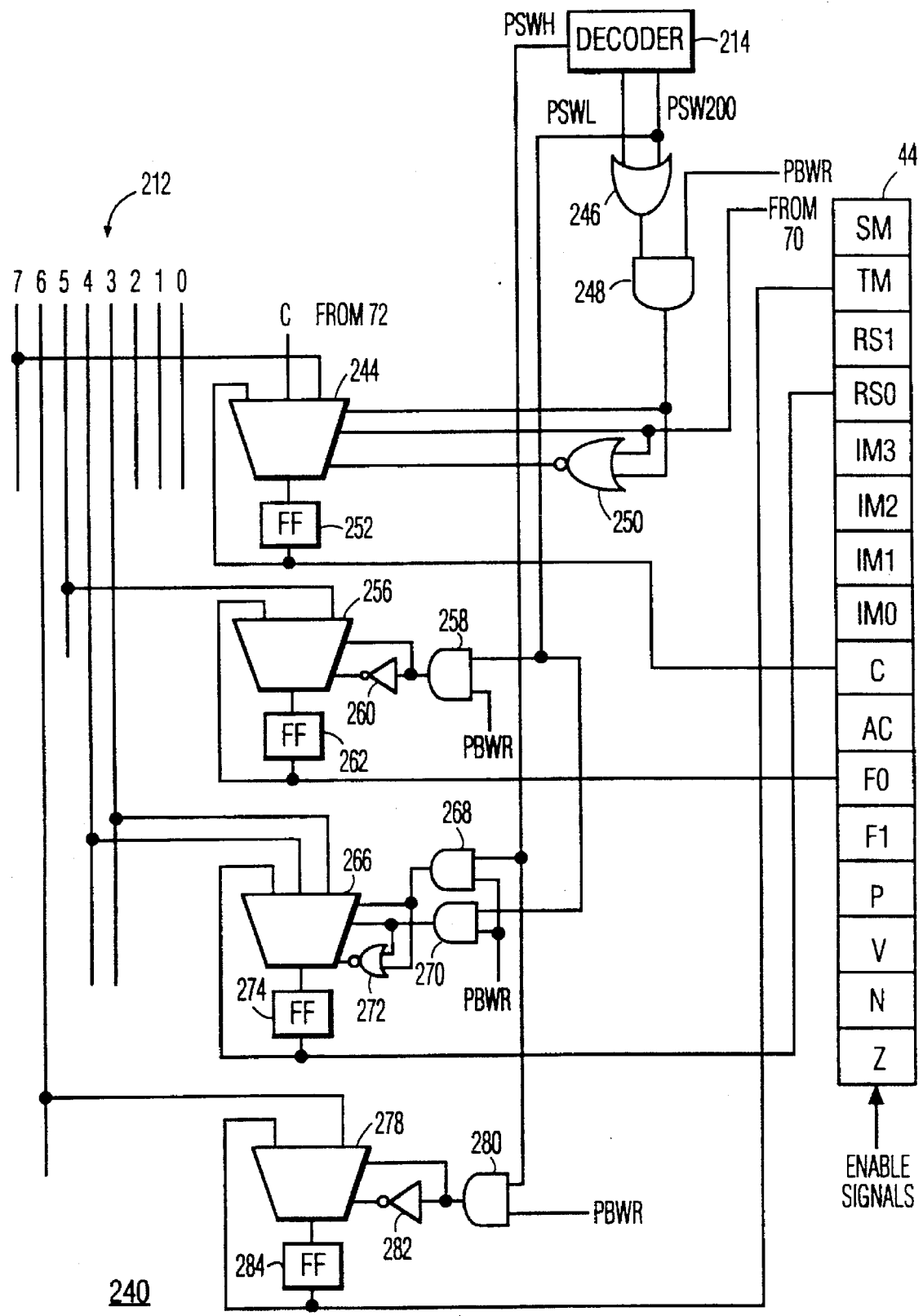
FIG. 6 depicts an example of a PSW write circuit according to the present invention

Writing of the PSW bits is performed under microcode program control by the BIU 22 first reading the particular byte from the register 44 over the peripheral bus 42, the execution unit 70 modifying the particular bit designated and then the BIU 22 writing the byte back to the register 44. During the transfer from the bus 42 to the register 44 only the particular bit which was modified is transferred to the register 44. The writing is controlled by an address decoding and bit selection circuit 240 as illustrated in FIG. 6.

As in the read circuit of FIG. 5 the address of the byte or PSW to be written is detected by the decoder 214. When the decoder 214 (see FIG. 6) detects that PSWH or PSW200 is being addressed and the bit selection field (see FIG. 3) indicates that the C bit is to be written, the C bit from the peripheral bus 212 is selected by a three-to-one, single bit multiplexer 244 based on a selection signal provided by OR gate 246, AND gate 248 and NOR gate 250. When the C bit is to be updated from the ALU 72 the multiplexer 244 selects the bit supplied by the ALU 72. When the selection signal indicates recirculation for bits not being changed the output of the multiplexer 244 is fed back to the input by flip-flop (FF) 252. Once the C bit is presented to the PSW register 44 an enable signal for that particular bit is provided by the execution unit 70 which results, in clocking the value into the bit of register 44. The AC and V bits have a bit selection arrangement that is the same as for the C bit but with different bits (lines 6 and 2, respectively) from the peripheral bus 212 supplying the data. The N and Z bits are also treated similarly to the C bit except the particular bits are again different (lines 0 and 2).

When the decoder 214 detects PSW200 is being addressed and the instruction field (see FIG. 4) indicates that the F0 bit is being addressed a two-to-one, single bit multiplexer 256 controlled by AND gate 258 and inverter 260 select the appropriate line (line 5) of the peripheral bus 212 and provide the bit to the PSW register 44 through a FF 262. Once again only that bit of the PSW register 44 is enabled. The F1 bit is written using the same circuit but the bit coming from line 1 of the bus 212.

Upon detection of either PSWH or PSW200 being asserted and that bit RS0 is being addressed, a three-to-one, single bit multiplexer 266 selects the appropriate bit from the bus 212 responsive to selection signals from AND gates 268 and 270, and NOR gate 272 and supplies the bit to register 44 through FF 274. The register 44 loads the bit upon the enable signal for that particular bit. The bit RS1 is written in the same way from a different pair of bus 212 lines.

When the TM bit is to be written a two-to-one, single bit multiplexer 278 as controlled by AND gate 280 and inverter 282 write the bit to register 44 through FF 284. The SM and IM0–IM3 bits are handle similarly while coming from different bus lines.

The present invention allows the microcontroller 12 to operate with and process instructions of a prior generation microcontroller so the backward compatibility is provided at the same time that the needs of a more complex microcontroller architecture are satisfied.

The present invention has been described with the PSW register 44 appearing as a contiguous set of bits located in a particular location. It is possible and sometimes preferred in complex architectures, such as that of the microcontroller 12, to locate or physically distribute the particular status register bits in proximity to the unit using the bits. For example, the C bit would be located in the ALU 72 and "appear" as if it were located in the SFR 44 area.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A microcontroller program status word apparatus for a microcontroller capable of executing first type instructions in a first mode of operation corresponding to a first generation of microcontrollers and capable of executing second type instructions in a second mode of operation corresponding to a second generation of microcontrollers, comprising:

a program status word register for holding status bits of a first format program status word corresponding to the first mode of operation and for holding also any additional status bits of a second format program status word that are not present in the first format program status word, the second format program status word corresponding to the second mode of operation; and a selection and transfer circuit connected to said register for selectively transferring status bits of the first format program status word to and/or from said register when the microcontroller is in the first mode of operation and for selectively transferring status bits of the second format program status word to and/or from said register when the microcontroller is in the second mode of operation.

2. An apparatus as recited in claim 1, wherein said circuit comprises:

a decoder for detecting whether an addressed program status word is the first format program status word or the second format program status word; and a multiplexer for selecting and transferring one or more bits of the register in response to the decoder detection.

3. An apparatus as recited in claim 2, wherein said decoder detects a read operation and said multiplexer transfers status bits from said register in parallel.

4. An apparatus as recited in claim 2, wherein said decoder detects a write operation and said multiplexer transfers a single status bit to said register.

5. An apparatus as recited in claim 2, wherein said decoder detects whether the microcontroller is in the first mode of operation or the second mode of operation.

6. A microcontroller, comprising:

a memory for holding first type instructions corresponding to a first generation of microcontrollers and second type instructions corresponding to a second generation of microcontrollers; and a processor coupled to the memory and including a program status word register for holding status bits of a first format program status word for use by the first type instructions and additional status bits of a second format program status word that are not present in the first format program status word for use by the second type instructions.

7. A microcontroller, comprising:

a processing unit for performing microcode operations and for providing an address corresponding either to a first format program status word or to a second format program status word and for providing a status bit to be written;

a bus interface connected to said unit for transferring the address;

a bus connected to said bus interface for carrying the address;

a program status word register connected to said processing unit;

a write circuit connected to said register, said bus and said unit, and responsive to whether the address corresponds to the first format program status word or to the second format program status word for transferring the status bit to said register from said bus; and a read circuit connected to said register and said bus, said read circuit being responsive to whether the address corresponds to the first format program status word or to the second format program status word for transferring status bits to said bus from said register.

* * * * *